(12) United States Patent
Stamps

(10) Patent No.: US 9,039,373 B2
(45) Date of Patent: May 26, 2015

(54) BLADE-PITCH CONTROL SYSTEM WITH FEEDBACK LEVER

(75) Inventor: Frank B. Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 608 days.

(21) Appl. No.: 13/325,679

(22) Filed: Dec. 14, 2011

(65) Prior Publication Data

US 2013/0156575 A1    Jun. 20, 2013

(51) Int. Cl.
*B64C 27/54* (2006.01)
*B64C 27/605* (2006.01)

(52) U.S. Cl.
CPC .................................. *B64C 27/605* (2013.01)

(58) Field of Classification Search
USPC ........... 416/98, 108, 109, 112, 147, 148, 159, 416/150, 164
See application file for complete search history.

(56) References Cited

U.S. PATENT DOCUMENTS 4,375,940 A * 3/1983 Lovera et al. ................ 416/114
4,573,873 A   3/1986 Yao et al.
4,804,352 A   2/1989 Schmidt
2005/0196275 A1 * 9/2005 Carson ........................ 415/211.2
2011/0280727 A1 11/2011 Stamps et al.

FOREIGN PATENT DOCUMENTS

DE          102008052692 B3    6/2010

OTHER PUBLICATIONS

Extended European Search Report Application No. 12153509.0-2422, issued by the European Patent Office on Mar. 26, 2012.
Office Action dated Nov. 4, 2014 from counterpart App. No. 2012104691264.

* cited by examiner

*Primary Examiner* — Edward Look
*Assistant Examiner* — Juan G Flores
(74) *Attorney, Agent, or Firm* — James E. Walton; Damon R. Hickman

(57) ABSTRACT

The present application includes a blade-pitch control system for controlling a pitch angle of each of a plurality of blades on an aircraft rotor. A feedback lever associated with each blade is pivotally mounted to the rotating portion of a swashplate assembly. A pitch link connects an output arm of a lever to a pitch horn of a corresponding blade, and a feedback link connects the input arm of the lever to a yoke. Flapping motion of the yoke causes motion of the feedback link, and this motion causes corresponding rotation of the lever. Rotation of the lever causes motion of the pitch link, which changes the pitch angle of the attached blade. This provides for selected pitch-flap coupling between flapping motion of the yoke and pitch motion of the blades.

12 Claims, 4 Drawing Sheets

BLADE-PITCH CONTROL SYSTEM WITH FEEDBACK LEVER

BACKGROUND

1. Field of the Invention

The present application generally relates to blade-control systems for aircraft rotors and specifically relates to a blade-pitch control system having a feedback lever.

2. Description of Related Art

Demand is increasing for rotary-wing aircraft, such as helicopters and tiltrotors, to provide more thrust, higher speeds, and carry heavier loads and/or heavier fuselages. Where performance criteria such as these are to be increased, the functional systems of the rotary-wing aircraft must be improved to provide the desired resultant performance enhancements. The rotor system is one of the many functional systems which require improvement in order to meet the demand for improved rotary-wing aircraft performance.

Rotary-wing aircraft have at least one rotor for providing lift and propulsion forces. These rotors have at least two airfoil blades connected to a central hub, and the hub is connected to a rotatable mast driven in rotation by an engine or motor. These blades may be adjustable for pitch angle, and the pitch angle is typically controlled by a swashplate assembly and linkage for connecting a rotating portion of the swashplate assembly to each blade.

One example of a prior-art system includes a swashplate movable in directions parallel to the mast axis toward and away from the rotor for collective control and which tilts about axes perpendicular to the mast axis for cyclic control. When the swashplate moves toward or away from the rotor, the pitch angle of each blade changes by the same amount, and in the same direction as each other blade. This collective control system, which is often referred to as a "rise and fall" system, provides for control of the thrust of the rotor, which is measured generally coaxial to the mast. On the other hand, tilting of the swashplate causes the pitch of each blade to change sinusoidally, or cyclically, as the rotor rotates, which causes the rotor to develop lift forces that vary across the plane of the rotor.

Although great strides have been made in the art of blade-pitch control systems, significant shortcomings remain.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

Figure 1:
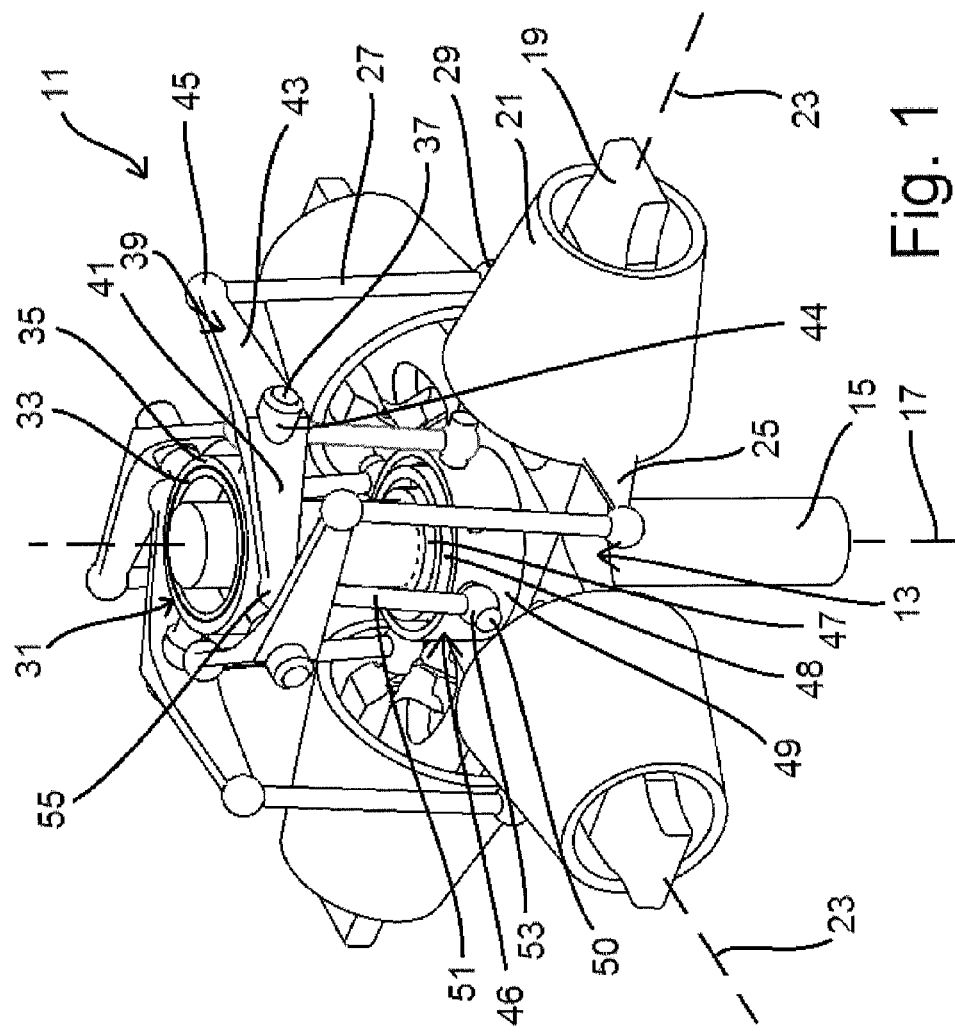
FIG. 1 is an oblique view of a rotor hub assembly comprising an embodiment of a blade-pitch control system.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DETAILED DESCRIPTION OF THE PREFERRED EMBODIMENT

Illustrative embodiments of the system of the present application are described below. In the interest of clarity, not all features of an actual implementation are described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

For example, the hub assemblies shown in the drawings are shown in a generally vertical orientation in the drawings, which is the orientation of the rotor assembly for a helicopter or for a tiltrotor aircraft configured for rotor-borne flight in helicopter mode. In the following description, components of the assembly may be described in relation to this orientation in the drawings, though it should be understood that this is for descriptive purposes only, as the orientation of the assembly will change during use.

The system and method of the present application includes a blade-pitch control system for aircraft rotors, as described herein, which provides for control of the pitch angle of blades attached to the rotor and provides for a lever feedback system within the pitch control system. The feedback system allows for the tilting of a yoke due to the flapping motion of the blades to be input into the blade-pitch control system, proving for additional control over the amount of "delta-3," or pitch-flap coupling, in the assembly.

Figure 2:
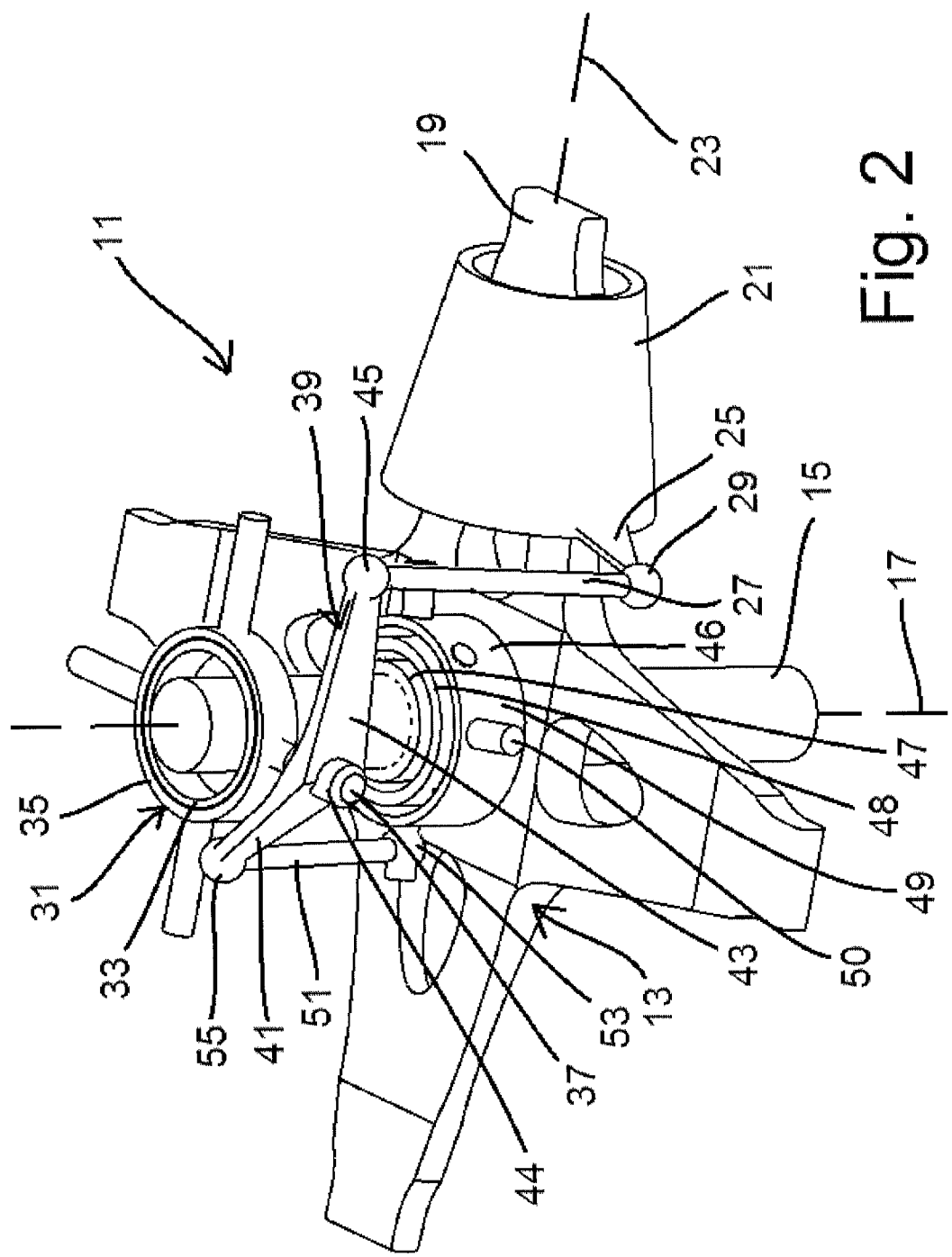
FIG. 2 is an oblique view of the rotor hub assembly of FIG. 1, with some of the components being removed for ease of viewing.
Figure 3:
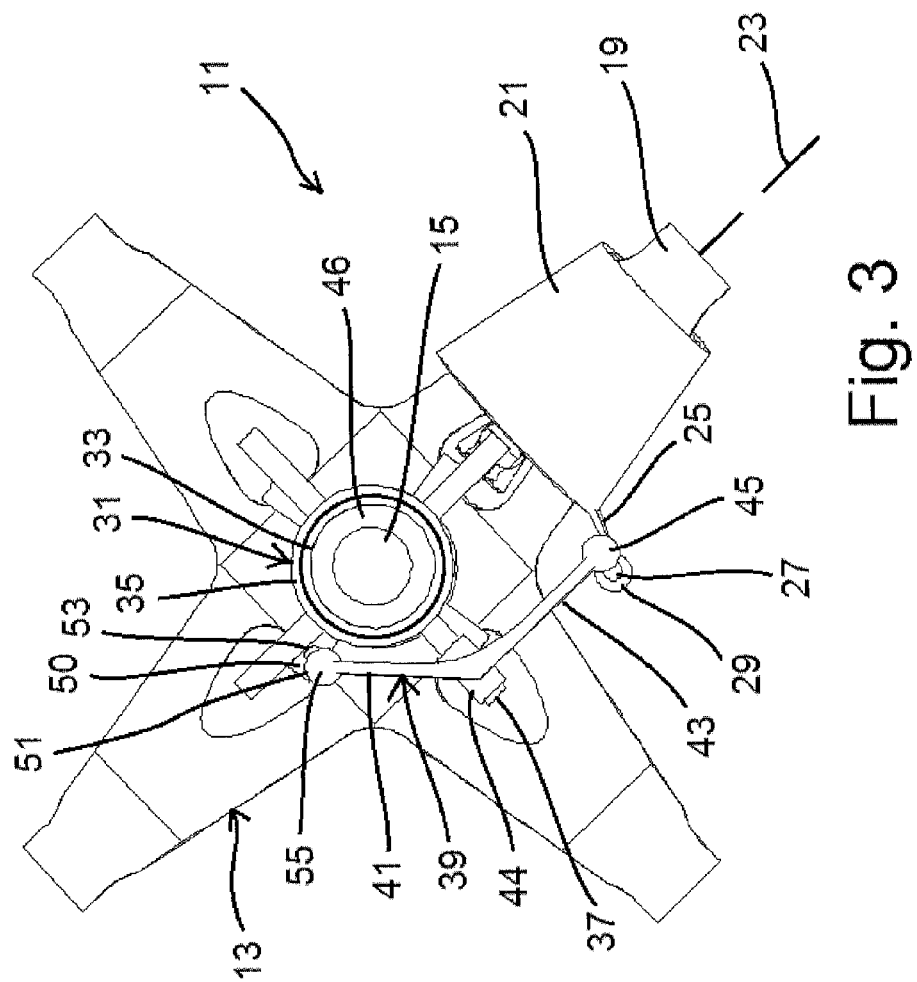
FIG. 3 is a top view of the rotor hub assembly of FIG. 1, with some of the components being removed for ease of viewing.

FIGS. 1 through 3 illustrate an embodiment of a blade-pitch control system having a lever feedback system. In FIGS. 2 and 3, portions of the system are removed for ease of viewing.

Referring to FIG. 1, a tiltrotor hub assembly 11 comprises a central yoke 13 rotatably mounted to mast 15. Yoke 13 is able to pivot about flap axes perpendicular to axis 17 of mast 15 while mast 15 drives yoke 13 in rotation with mast 15 about mast axis 17. Yoke 13 comprises multiple arms 19 extending generally radially from the central region of yoke 13. A blade grip 21 is rotatably mounted to each arm 19, such that each grip 21 is rotatable relative to the associated arm 19 about a corresponding pitch axis 23 (two are shown). Grips 21 may be integral, inboard portions of rotor blades or may be configured for attachment of a separate rotor blade. A fixed pitch horn 25 extends from an inner portion of each grip 21, and a rigid pitch link 27 is rotatably connected to each pitch horn 25 at end 29. This configuration allows for movement of each pitch link 27 in directions generally parallel to mast axis 17 to cause rotation of the associated grip 21 and associated blade about the corresponding pitch axis 23.

A swashplate assembly 31 comprises an inner, non-rotating swashplate ring 33 and a coaxial outer, rotating swashplate ring 35, which is rotatably attached to ring 33 with bearings in a manner that allows ring 35 to freely rotate relative to ring 33 about their shared axis while providing for transfer of mechanical forces (other than torsional forces about their shared axis) between ring 33 and ring 35.

During operation, rotating ring 35 rotates along with mast 15 and yoke 13 about mast axis 17, whereas non-rotating ring 33 does not rotate with mast 15 about axis 17. Swashplate assembly 31 is coupled to mast 15 in a manner that allows swashplate assembly 31 to translate a limited amount along the length of mast 15 and to tilt about axes perpendicular to mast 15. To control the motions of swashplate 31, non-rotating swashplate ring 33 is connected to a swashplate actuation system (not shown) that causes translation of swashplate 31 for collective blade-pitch control and/or tilting of swashplate 31 for cyclic blade-pitch control. The operation of the actuation system is in response to inputs from a pilot and/or a flight control system.

In the embodiment shown, four rigid pivot shafts 37 extend radially from rotating ring 35, and each shaft 37 is configured to pivotally carry a feedback lever 39. Each lever 39 is a rigid, elongated member comprising an input arm 41 and an output arm 43. The relative lengths of arms 41, 43 are defined by pivot 44 and its axis, pivot 44 being mounted on pivot shaft 37 and allowing for rotation of lever 39 relative to ring 35. Each pitch link 27 is rotatably attached at end 45 to an end portion of output arm 43 of feedback lever 39.

During operation, the blades of a rotor system may move in a flapping motion, in which the blades move in out-of plane directions due to aerodynamic forces on the blades. For example, during forward movement in rotor-borne flight, an advancing blade is subjected to a given speed of air across the blade, which produces lift on that blade and causes it to rise in an out-of-plane direction. A corresponding effect is seen with a blade on the opposite side of the rotor mast, as it will be retreating and be subjected to a lower speed of air across the blade, resulting in the blade producing a smaller amount of lift. In a rotor having a yoke connected to the mast with a gimbal, such as a CV joint, the result of these two forces are that the yoke rotates about the flapping axes of the gimbal.

As described above, yoke 13 is coupled to mast 15, such that yoke rotates about mast axis 17 along with mast 15 while allowing for yoke to flap relative to mast 15. A constant-velocity (CV) joint or similar coupling is used as a gimbal to couple yoke 13 to mast 15, and this allows for the flapping motion of yoke 13 relative to mast 15 while mast drives yoke 13 in rotation about axis 17. CV joint 46 comprises an inner ring 47, an intermediate ring 48, and an outer ring 49. Inner ring 47 is rigidly connected to mast 15, and outer ring 49 is rigidly connected to yoke 13. Rings 47, 48, 49 are pivotally connected to each other to form a gimbal that drives yoke 13 in rotation with mast 15 about mast axis 17 while also allowing yoke 13 to freely pivot relative to mast 15 about the flap axes.

In the embodiment shown, four rigid output shafts 50 extend from outer ring 49, and a rigid feedback link 51 connects each output shaft 50 to a portion of the input arm 41 of a feedback lever 39. Feedback link 51 is rotatably connected to output shaft 50 at end 53, and link 51 is rotatably connected to input arm 41 at end 55. Each feedback lever 39 connects an output shaft 50 and a pitch horn 25 on generally opposing sides of mast 15.

During operation of hub assembly 11, the swashplate actuation system causes swashplate assembly 31 to translate and/or tilt relative to mast 15. When swashplate assembly 31 is translated, the motion parallel to mast axis 17 of assembly 31 is transferred from swashplate ring 33 to pitch horns 25 through the mechanical connections of ring 33 to ring 35, from ring 35 to each pivot shaft 37, each pivot shaft 37 to the associated feedback lever 39, and each output arm 43 of each lever 39 to the connected pitch horn 25 through the associated pitch link 27, resulting in collective control of the pitch of all grips 21 and associated blades. Likewise, when swashplate assembly 31 is tilted, the tilting motion relative to mast axis 17 of assembly 31 is transferred from swashplate ring 33 to pitch horns 25 through the same mechanical connections, resulting in differential, cyclic control of the pitch of all grips 21 and associated blades.

Differential aerodynamic forces on blades associated with grips 21 cause flapping of yoke 13 relative to mast 15, and outer ring 49 moves relative to mast 15 along with yoke 13. Motion of outer ring 49 causes corresponding tilting motion of output shafts 50, and this motion is transferred through motion of each feedback link 51 to the connected input arm 41 of each feedback lever 39. Lever 39 pivots about pivot shaft 37, and the resulting motion of output arm 43 is transferred to the connected pitch horn 25 and grip 21 through pitch link 27. Thus, a selected amount of feedback of the motion of yoke 13 during flapping is fed into the system through feedback lever 39, and flap motion of yoke 13 thereby creates a change in the pitch angle of grips 21 and the associated blades. This additional change in pitch angle of grips 21 is independent of the existing pitch angle due to the position and orientation of swashplate 31 which is determined by the swashplate actuation system.

One advantage of this blade-pitch control system is that the amount of pitch-flap coupling is adjustable through selection of characteristics of the assembly. For example, the choice of relative lengths of arms 41, 43 of lever 39 will determine the ratio of motion between feedback link 51 and pitch link 27. Lever 39 is shown having arms 41, 43 of approximately the same length, which will provide for a 1:1 motion ratio. However, configuring lever 39 with arms 41, 43 having different lengths will provide for a motion ratio other than 1:1, and this is one method for tailoring the system to provide the desired amount of pitch-flap coupling.

Likewise, additional methods for tailoring the amount of pitch-flap coupling include altering the location of output shafts 50 on outer ring 49 and/or the location of pivot shafts 37 on swashplate ring 35. These are only two examples, but additional modifications may be necessary to achieve the desired results, as the amount of pitch-flap coupling will vary based on the specific application. The described system is especially useful for a tiltrotor aircraft, as the system provides the required delta-3 control input for stability during forward, wing-borne flight of the tiltrotor when configured in airplane mode.

Hub assembly 11 is shown in the figures with feedback levers 39 located above, or outboard, of yoke 13. However, in another embodiment feedback levers 39 are located below, or inboard, of yoke 13. This would position levers 39 between yoke 13 and an engine or gearbox for rotating mast 15.

Figure 4:
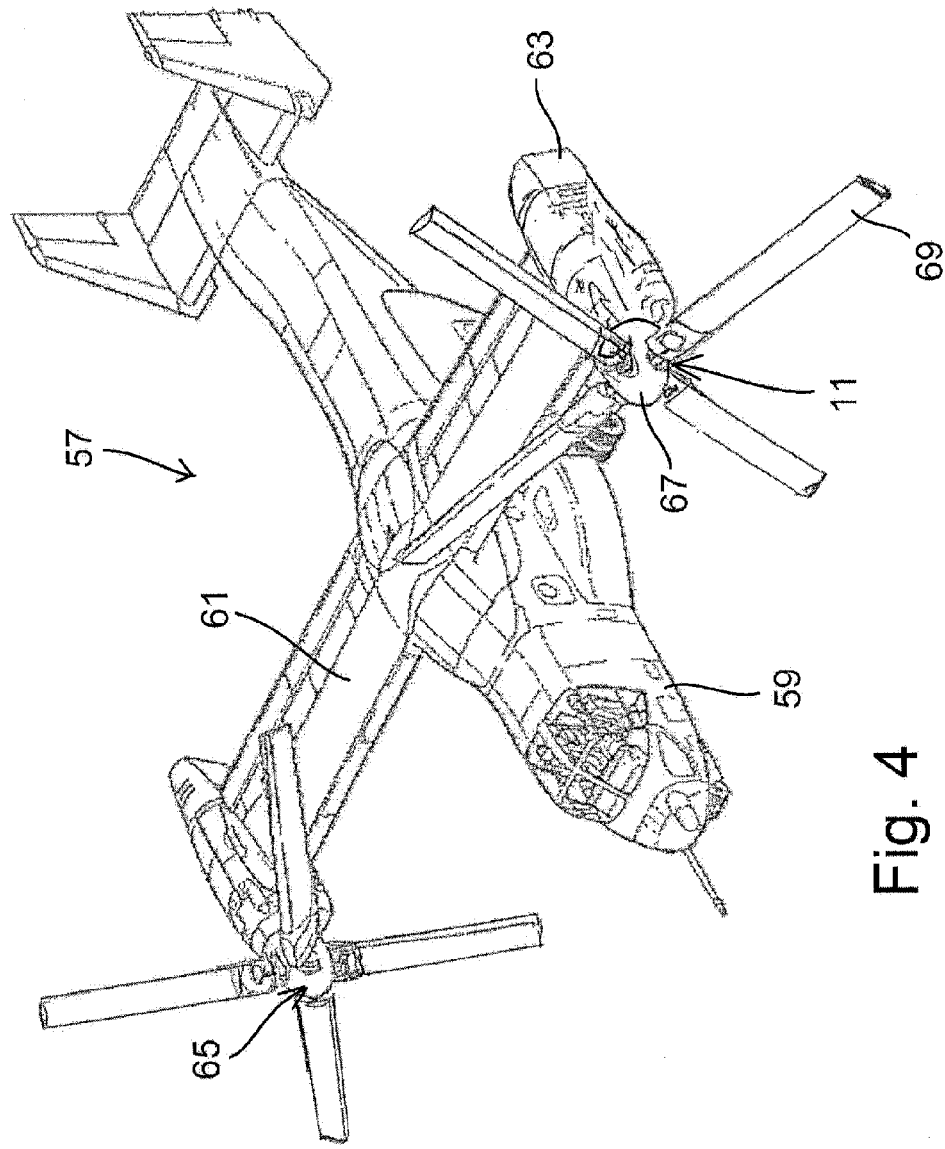
FIG. 4 is an oblique view of an aircraft having the rotor hub assembly of FIG. 1 installed thereon.

Referring to FIG. 4, tiltrotor aircraft 57 includes a fuselage 59 and wing 61 attached to fuselage 59. Rotating engine nacelles 63 are pivotally mounted to opposing ends of wing 61 and house engines (not shown) for supplying torque to turn a rotor mast housed in each nacelle 63. Two rotors 65 each comprise a central rotor hub assembly housed under an aerodynamic cover 67, and each rotor 65 has a blade-pitch control system with lever feedback, such as assembly 11, which is shown and described above. The hub assembly of each rotor 65 connects blades 69 to the associated rotor mast, the masts being driven in rotation by the torque from the engines for rotating rotors 65. Tiltrotor 57 is capable of flying in a helicopter mode, in which each nacelle 63 is positioned approximately vertical, and flying in an airplane mode, in which each nacelle 63 is positioned approximately horizontal (as shown).

Tiltrotor 57 Is illustrated as an exemplary aircraft that may employ the system of the present application. It should be appreciated any variety of aircraft types may use the system of the present application for main rotor blades, tail rotor blades, or propellers. A non-exhaustive list of exemplary aircraft types may include airplanes, gyrocopters, and unmanned aircraft.

The system of the present application provides significant advantages, including: (1) a method for introducing flap motions into the control system as feedback, and (2) a reduced size of components necessary for desired control of blade pitch.

While this invention has been described with reference to at least one illustrative embodiment, this description is not intended to be construed in a limiting sense. Various modifications and combinations of the illustrative embodiments, as well as other embodiments of the invention, will be apparent to persons skilled in the art upon reference to the description.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A blade-pitch control system for controlling a pitch angle of each of a plurality of blades on an aircraft rotor, the blades being rotatably connected to a yoke for rotation with a rotor mast, the control system comprising:
   a swashplate assembly having a non-rotating portion and a rotating portion;
   a feedback lever associated with each blade, each lever being pivotally mounted to the rotating portion of the swashplate assembly, an input arm and an output arm extending from opposing sides of a pivot axis of the lever, the arms moving in opposite directions when the lever is pivoted relative to the rotation portion;
   a pitch link connecting the output arm to a pitch horn of a corresponding blade;
   a feedback link connecting the input arm to the yoke; and
   a pivot shaft for pivotal mounting of each lever, each pivot shaft extending radially outward from the rotating portion of the swashplate assembly;
   wherein flapping motion of the yoke causes motion of the feedback link, and this motion causes corresponding rotation of the lever and motion of the pitch link, providing for selected pitch-flap coupling between flapping motion of the yoke and pitch motion of the blades.

2. The blade-pitch control system of claim 1, wherein the feedback link is connected to the yoke through a portion of a gimbal connecting the yoke to the mast.

3. The blade-pitch control system of claim 1, wherein each lever has arms of approximately equal length.

4. The blade-pitch control system of claim 1, wherein each lever has arms of unequal length.

5. A method of controlling a pitch angle of each of a plurality of blades on an aircraft rotor, the blades being rotatably connected to a yoke for rotation with a rotor mast, the method comprising:
   (a) pivotally connecting a feedback lever associated with each blade to a rotating portion of a swashplate assembly, an input arm and an output arm extending from opposing sides of a pivot axis of the lever, the arms moving in opposite directions when the lever is pivoted relative to the rotation portion; and
   providing a pivot shaft for pivotal mounting of each lever, each pivot shaft extending radially outward from the rotating portion of the swashplate assembly;
   (b) connecting the output arm to a pitch horn of a corresponding blade with a pitch link;
   (c) connecting the input arm to the yoke with a feedback link; and
   (d) changing a pitch angle of a blade by introducing feedback due to flapping motion of the yoke and the corresponding motion of the lever and the pitch link.

6. The method of claim 5, wherein step (c) comprises connecting the input arm to the yoke through a portion of a gimbal connecting the yoke to the mast.

7. The method of claim 5, wherein step (a) comprises configuring each lever to have arms of approximately equal length.

8. The method of claim 5, wherein step (a) comprises configuring each lever to have arms of unequal length.

9. An aircraft having a blade-pitch control system for controlling a pitch angle of each of a plurality of blades on an aircraft rotor, the blades being rotatably connected to a yoke for rotation with a rotor mast, the control system comprising:
   a swashplate assembly having a non-rotating portion and a rotating portion;
   a feedback lever associated with each blade, each lever being pivotally mounted to the rotating portion of the swashplate assembly, an input arm and an output arm extending from opposing sides of a pivot axis of the lever, the arms moving in opposite directions when the lever is pivoted relative to the rotation portion;
   a pitch link connecting the output arm to a pitch horn of a corresponding blade;
   a feedback link connecting the input arm to the yoke; and
   a pivot shaft for pivotal mounting of each lever, each pivot shaft extending radially outward from the rotating portion of the swashplate assembly;
   wherein flapping motion of the yoke causes motion of the feedback link, and this motion causes corresponding rotation of the lever and motion of the pitch link, providing for selected pitch-flap coupling between flapping motion of the yoke and pitch motion of the blades.

10. The aircraft of claim 9, wherein the feedback link is connected to the yoke through a portion of a gimbal connecting the yoke to the mast.

11. The aircraft of claim 9, wherein each lever has arms of approximately equal length.

12. The aircraft of claim 9, wherein each lever has arms of unequal length.

* * * * *